(12) United States Patent
Fujimoto et al.

(10) Patent No.: US 12,553,856 B2
(45) Date of Patent: Feb. 17, 2026

(54) ELECTROCHEMICAL DEVICE, SENSOR, AND SENSOR SYSTEM

(71) Applicant: KABUSHIKI KAISHA TOSHIBA, Tokyo (JP)

(72) Inventors: Akira Fujimoto, Kawasaki Kanagawa (JP); Yosuke Akimoto, Yokohama Kanagawa (JP); Hiroaki Yamazaki, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 645 days.

(21) Appl. No.: 17/822,761

(22) Filed: Aug. 26, 2022

(65) Prior Publication Data

US 2023/0280306 A1   Sep. 7, 2023

(30) Foreign Application Priority Data

Mar. 1, 2022   (JP) .................... 2022-030912

(51) Int. Cl.
*G01N 27/416* (2006.01)
*H02J 7/00* (2006.01)

(52) U.S. Cl.
CPC ........ *G01N 27/4162* (2013.01); *H02J 7/0063* (2013.01)

(58) Field of Classification Search
CPC .... G01N 27/42; G01N 27/403; G01N 27/048; G01N 27/223; G01N 27/225;

(Continued)

(56) References Cited

U.S. PATENT DOCUMENTS 4,282,480 A * 8/1981 Fujito .................. G01N 27/225
    324/676
4,576,706 A * 3/1986 Takata .................. G01N 27/42
    73/61.58

(Continued)

FOREIGN PATENT DOCUMENTS

JP    2002-317291 A    10/2002
JP    2003-301290 A    10/2003
JP    2019-203193 A    11/2019

OTHER PUBLICATIONS

Japan Patent Office Action, Office Action in JP App. No. 2022-030912, 4 pages, and machine translation, 4 pages (Aug. 20, 2024).

*Primary Examiner* — Gurpreet Kaur
(74) *Attorney, Agent, or Firm* — Finnegan, Henderson, Farabow, Garrett & Dunner, LLP (57) ABSTRACT

According to one embodiment, an electrochemical device includes an electrochemical element, and a controller. The electrochemical element includes a first electrode, a second electrode, and a first member provided between the first electrode and the second electrode. The controller is electrically connected to the first electrode and the second electrode. The controller is configured to supply a first signal between the first electrode and the second electrode. The first signal includes a waveform repeating in a first period. The waveform includes a first duration of a first voltage of a first polarity, and a second duration of a second voltage of the first polarity. An absolute value of the second voltage is smaller than an absolute value of the first voltage.

21 Claims, 5 Drawing Sheets

(58) Field of Classification Search
CPC .. G01N 27/4162; G01N 27/605; G01N 27/00; G01N 27/60; H02J 7/0063; C25B 1/02; C25B 1/04; C25B 1/042; C25B 1/044; C25B 1/13

See application file for complete search history.

(56) References Cited

U.S. PATENT DOCUMENTS

| | | | |
|---|---|---|---|
| 2002/0130035 A1 | 9/2002 | Ikeda et al. | |
| 2005/0284772 A1* | 12/2005 | Farber | G01N 27/4065 205/775 |
| 2015/0010843 A1* | 1/2015 | Song | H01M 8/04119 429/480 |
| 2018/0087794 A1* | 3/2018 | Bahar | C25B 9/73 |

* cited by examiner

ELECTROCHEMICAL DEVICE, SENSOR, AND SENSOR SYSTEM

CROSS-REFERENCE TO RELATED APPLICATIONS

This application is based upon and claims the benefit of priority from Japanese Patent Application No. 2022-030912, filed on Mar. 1, 2022; the entire contents of which are incorporated herein by reference.

FIELD

Embodiments of the invention generally relate to an electrochemical device, a sensor and a sensor system.

BACKGROUND

For example, there are electrochemical devices such as dehumidifiers. It is desired to reduce the power consumption of the electrochemical devices.

DETAILED DESCRIPTION

According to one embodiment, an electrochemical device includes an electrochemical element, and a controller. The electrochemical element includes a first electrode, a second electrode, and a first member provided between the first electrode and the second electrode. The controller is electrically connected to the first electrode and the second electrode. The controller is configured to supply a first signal between the first electrode and the second electrode. The first signal includes a waveform repeating in a first period. The waveform includes a first duration of a first voltage of a first polarity, and a second duration of a second voltage of the first polarity. An absolute value of the second voltage is smaller than an absolute value of the first voltage.

According to one embodiment, a sensor includes the electrochemical device described above, and a detector provided inside the housing. The electrochemical device further includes the housing, and the electrochemical element is configured to absorb water in a space inside the housing.

According to one embodiment, a sensor system includes the sensor described above, a processing device. The sensor includes a communication portion. The processing device is configured to process information based on a signal obtained from the communication portion.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

Figure 1:
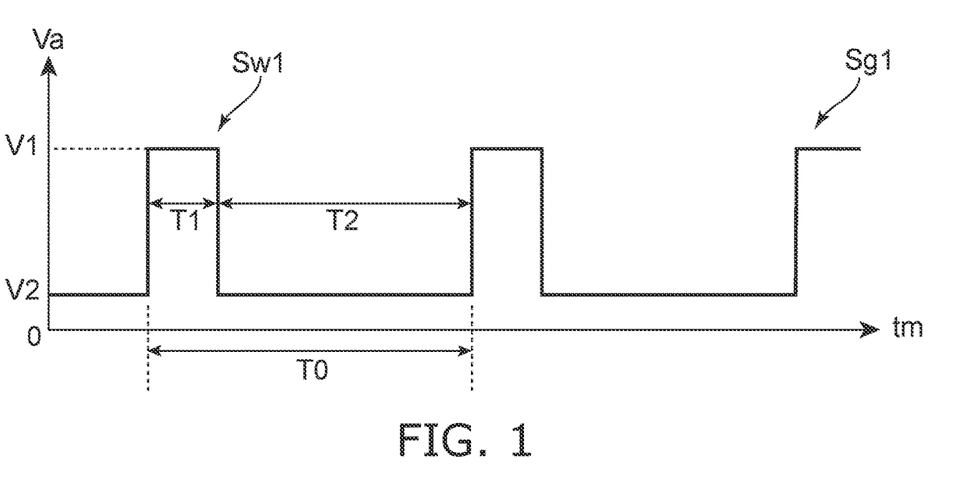
FIG. 1 is a schematic diagram illustrating an operation of an electrochemical device according to a first embodiment.

FIG. 1 is a schematic diagram illustrating an operation of an electrochemical device according to the first embodiment.

Figure 2:
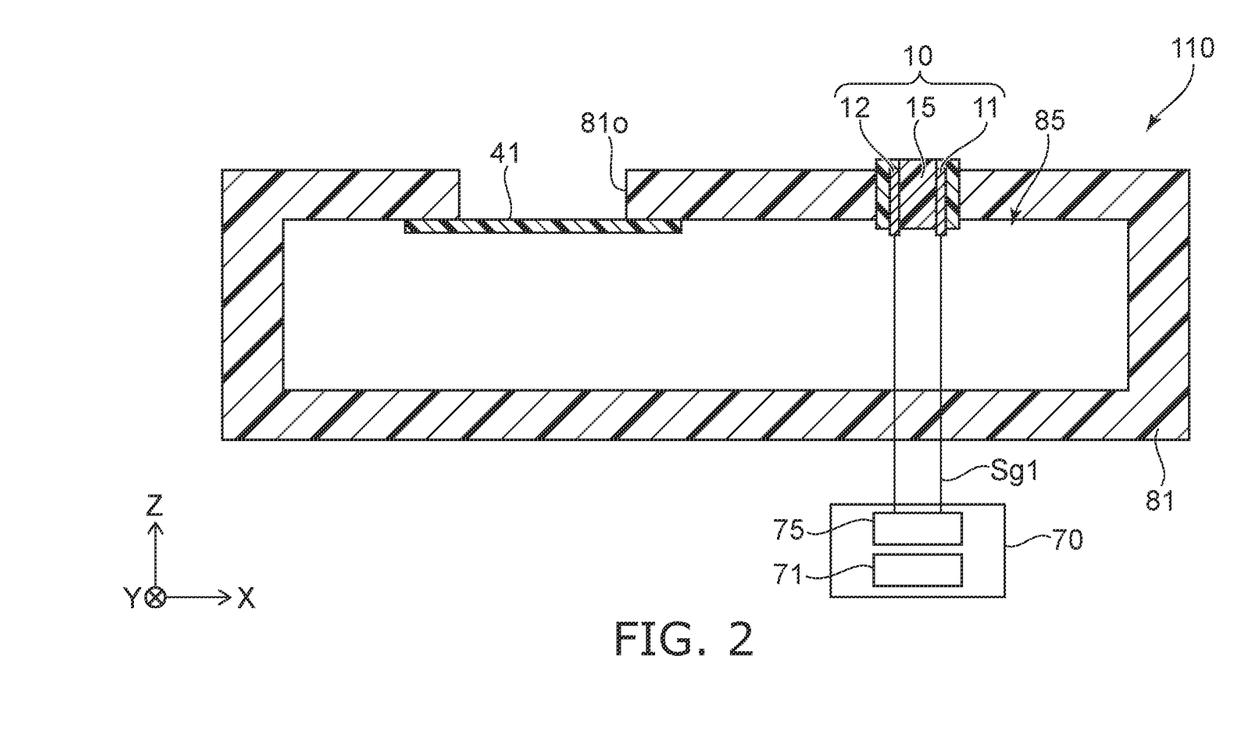
FIG. 2 is a schematic cross-sectional view illustrating the electrochemical device according to the first embodiment.

FIG. 2 is a schematic cross-sectional view illustrating the electrochemical device according to the first embodiment.

As shown in FIG. 2, an electrochemical device 110 according to the embodiment includes an electrochemical element 10 and a controller 70.

The electrochemical element 10 includes a first electrode 11, a second electrode 12, and a first member 15. The first member 15 is provided between the first electrode 11 and the second electrode 12. For example, the first member 15 includes a polyelectrolyte.

The electrochemical element 10 is configured to perform at least one of dehumidification, humidification, ozone generation, oxygen generation, oxygen removal, or hydrogen generation, for example. By applying a voltage between the first electrode 11 and the second electrode 12, at least one of dehumidification, humidification, ozone generation, oxygen generation, oxygen removal, or hydrogen generation can be performed.

Hereinafter, an example in which the electrochemical element 10 has a dehumidifying function will be described. Dehumidification is performed by applying a voltage between the first electrode 11 and the second electrode 12. For example, by applying a voltage, water is absorbed by the first member 15. As a result, dehumidification is performed. The voltage is applied by the controller 70.

For example, a voltage based on the second electrode 12 is applied to the first electrode 11. For example, when a voltage of the first polarity is applied to the first electrode 11, the electrochemical element 10 absorbs water. In the following, the first polarity is positive. Dehumidification is performed when a voltage of the first polarity is applied to the first electrode 11.

In this example, the electrochemical device 110 further includes a housing 81. The electrochemical element 10 can absorb water in the space 85 in the housing 81. As a result, the space inside the housing 81 is dehumidified. The housing 81 may include, for example, resin, ceramic, metal, or the like.

In this example, the electrochemical device 110 further includes a first film 41. The housing 81 includes an opening 81o. The first film 41 is provided so as to close the opening 81o, for example. As will be described later, the first film 41 is porous. The first film 41 is substantially impermeable to liquids (e.g., water). For example, the first film 41 allows a gas (for example, hydrogen) to pass through.

By providing the first film 41 in the opening 81o, the influence of external humidity is suppressed in the space 85 inside the housing 81. Due to the electrochemical action (for example, dehumidification) by the electrochemical element 10, the state of the space 85 becomes a target state. As will be described later, by providing the detector or the like in the housing 81, the state of the detector can be maintained at the target state (for example, low humidity).

As shown in FIG. 2, the controller 70 is electrically connected to the first electrode 11 and the second electrode 12. In this example, the controller 70 includes a circuit portion 75 and a first battery 71. The first battery 71 is configured to supply electric power to the circuit portion 75. The circuit portion 75 is configured to apply a voltage between the first electrode 11 and the second electrode 12. The voltage is, for example, the first signal Sg1. By applying the first signal Sg1 (voltage) to the first electrode 11 and the second electrode 12, the electrochemical action (for example, dehumidification) in the electrochemical element 10 is performed.

In the embodiment, the electrochemical device 110 is driven by the first battery 71. This enables operation in places where commercial power or the like is not supplied. The applications of the electrochemical device 110 and various devices using the electrochemical device 110 will be expanded. It is desired to reduce the power consumption of the electrochemical device 110.

Generally, the electrochemical element 10 is often driven by a DC signal (DC voltage) having a constant value. In this case, a direct current having a constant value flows in the electrochemical element 10. Thereby, the power is always consumed, and this leads to an increases power consumption.

In the embodiment, the voltage (first signal Sg1) supplied to the electrochemical element 10 is a duty signal. As a result, power consumption can be reduced. At this time, as will be described later, it was found that power consumption can be reduced while maintaining high electrochemical action by making the first signal Sg1 a special waveform. Hereinafter, an example of the voltage (first signal Sg1) in the embodiment will be described.

FIG. 1 illustrates the first signal Sg1. The horizontal axis of FIG. 1 is time tm. The vertical axis is the voltage Va between the first electrode 11 and the second electrode 12. The voltage Va is a potential with reference to the potential of the second electrode 12.

As shown in FIG. 1, the first signal Sg1 includes a waveform Sw1 that repeats in a first period T0. The waveform Sw1 includes a first duration T1 and a second duration T2. In the first duration T1, the voltage Va is a first voltage V1 of the first polarity. In the second duration T2, the voltage Va is a second voltage V2 of the first polarity. The first polarity is one of positive and negative. In this example, the first polarity is positive. The first voltage V1 and the second voltage V2 are positive. The absolute value of the second voltage V2 is smaller than the absolute value of the first voltage V1.

In one example, the first voltage V1 is not less than 2.5 V and not more than 3.5 V. In one example, the second voltage V2 is not less than 0.5 V and not more than 1.5 V. With such a first signal Sg1, it is possible to reduce power consumption while maintaining the desired high electrochemical action (for example, dehumidification). According to the embodiment, an electrochemical device capable of reducing power consumption is provided.

For example, there is a first reference example in which a high voltage first voltage V1 is always applied. In the first reference example, the second duration T2 of low voltage is not provided. In the first reference example, although a high electrochemical action can be obtained, the power consumption is large.

On the other hand, a second reference example in which the first duration T1 of a high voltage (first voltage V1) and the second duration T2 of 0 voltage are provided can be considered. According to the inventor's experiment, in the second reference example, it was found that the power consumption can be reduced, but the electrochemical action is deteriorated. In the second reference example, it was found that a negative current flows during the transition period in which the voltage Va changes from the first voltage V1 to 0 voltage. This is thought to be due to a phenomenon in which a reverse polarity current causes the reverse reaction in the electrochemical action during the transition period. For example, water is adsorbed on the first member 15 by a current having the positive polarity. At this time, it is considered that the negative current generated during the transition period causes a reverse reaction and water is discharged from the first member 15. As a result, in the second reference example, the performance of the electrochemical action (for example, dehumidification) deteriorates.

In the embodiment, as described above, the second voltage V2 with low voltage is also of the first polarity (positive). The second voltage V2 is not 0 voltage. As a result, the current flowing during the transition period from the first duration T1 of the high voltage (first voltage V1) to the second duration T2 of the low voltage (second voltage V2) is unlikely to become a negative current. The current flowing during the transition period is a positive current. Or, even if the current flowing during the transition period is negative, its absolute value is small. This suppresses the reverse reaction. As a result, the desired electrochemical action can be effectively obtained. Then, the power consumption can be reduced by providing the second duration T2 of the low voltage second voltage V2.

As described above, the embodiment may be allied to a case where the desired electrochemical action occurs when the voltage of the first polarity (for example, positive) is applied to the first electrode 11, and a reverse action opposite to the desired electrochemical action occurs when the voltage of the opposite polarity (for example, negative) is applied to the first electrode 11. Thereby, high electrochemical characteristics can be maintained and low power consumption can be obtained.

For example, when a voltage Va of the first polarity is applied to the first electrode 11, the electrochemical element 10 absorbs water. On the other hand, for example, when a voltage Va of the second polarity is applied to the first electrode 11, the electrochemical element 10 discharges water. The second polarity is the opposite of the first polarity.

In the embodiment, a ratio (duty ratio) of the first duration T1 to the first period T0 is, for example, 0.5 or less. As a result, power consumption can be effectively reduced.

In the embodiment, the ratio (duty ratio) of the first duration T1 to the first period T0 may be 0.1 or more. If the duty ratio is too low, the effect of electrochemical action may not be sufficient. Practically, the above ratio is, for example, not less than 0.3 and not more than 0.5.

In the embodiment, the waveform Sw1 is substantially a square wave. This result in an easy generation of the waveform Sw1.

The first period T0 is, for example, not less than 1 ms and not more than 1000 seconds. In such a range, high electrochemical action and low power consumption can be obtained.

Figure 3A:
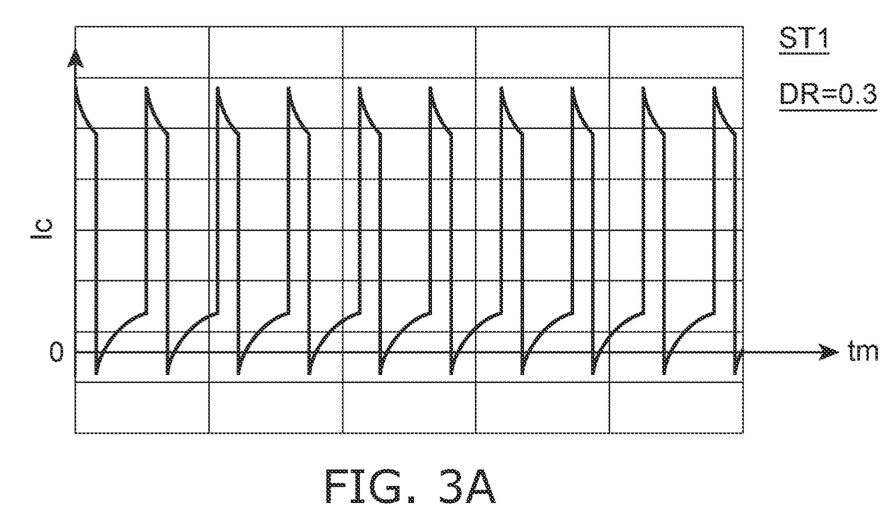
FIGS. 3A and 3B are schematic views illustrating the characteristics of an electrochemical device.
Figure 3B:
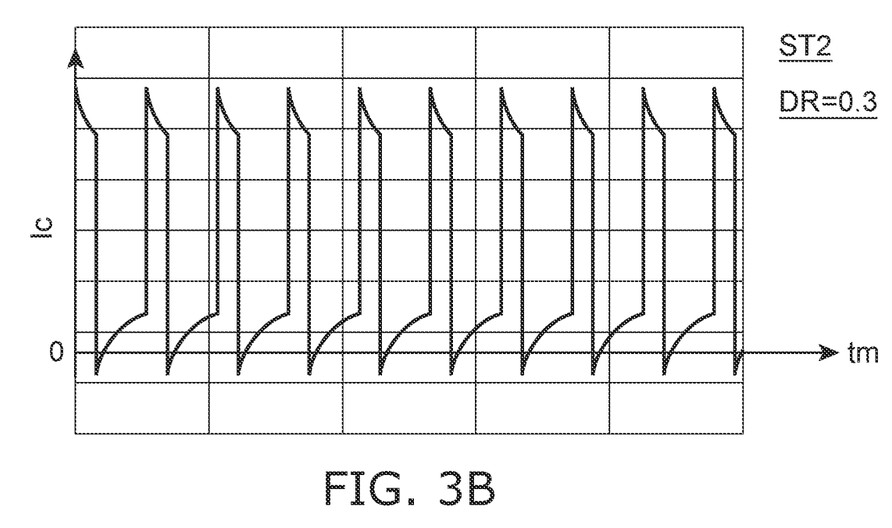

FIGS. 3A and 3B are schematic views illustrating the characteristics of the electrochemical device.

The horizontal axis of these figures is time tm. The vertical axis is the current is flowing between the first electrode 11 and the second electrode 12. In these figures, the ratio of the first duration T1 to the first period T0 (duty ratio DR) is 0.3. In these figures, the first voltage V1 is 3V. In these figures, the conditions of the second voltage V2 are different. In the first condition ST1 corresponding to FIG. 3A, the second voltage V2 is 1V. In the first condition ST1 corresponding to FIG. 3A, the second voltage V2 is 1V. In the second condition ST2 corresponding to FIG. 3B, the second voltage V2 is 0V.

As shown in FIG. 3B, the negative current is large under the second condition ST2. On the other hand, as shown in FIG. 3A, the negative current is small under the first condition ST1. The dehumidifying performance in the first condition ST1 is higher than the dehumidifying performance in the second condition ST2. As described above, high electrochemical action can be obtained under the first condition ST1.

Hereinafter, an example of the result of the experiment carried out by the inventor will be described. Under the first drive condition of the first experiment, the second voltage V2 is 0V and the first voltage V1 is 3V. The volume of the space 85 in the housing 81 is 80 cm$^3$. The first period T0 is 1 second (that is, the frequency is 1 Hz). In the first experiment, the operation is performed with different duty ratio DR. Humidity in the initial state before the operation (initial value) and humidity after 20 minutes of operation (post-operation value) are measured. The difference between the initial value and the post-operation value is defined as the humidity change ΔH. The humidity changes ΔH at different duty ratios DR are as follows.

DR=1: ΔH=3.5% RH
DR=0.5: ΔH=3.5% RH
DR=0.3: ΔH=1.5% RH

Thus, under the first drive condition, when the duty ratio DR is 0.3, the humidity change ΔH becomes small. Sufficient dehumidification is difficult.

Under the second drive condition of the second experiment, the second voltage V2 is 1V and the first voltage V1 is 3V. Under the second drive condition, the humidity changes ΔH at different duty ratios DR are as follows.

DR=1: ΔH=3.5% RH
DR=0.5: ΔH=3.5% RH
DR=0.3: ΔH=3.5% RH
DR=0.2: ΔH=3.5% RH

Thus, under the second driving condition, high dehumidifying performance can be obtained even when the duty ratio DR is low (for example, 0.2).

In the third experiment, the second drive condition is used, the duty ratio DR is set to 0.2, and the first period T0 (that is, frequency) is changed. In the third experiment, the volume of the space 85 in the housing 81 is 80 cm$^3$. In the third experiment, when the duty ratio DR is 1, the humidity change ΔH is 6% RH. In the third experiment, the humidity change ΔH is 6% RH for all cases where the frequency is 1 kHz, 100 Hz, 1 Hz, 100 MHz, 10 MHz and 1 MHz. As described above, by using the second driving condition, high dehumidifying performance can be obtained at various frequencies even in the case of a low duty ratio DR (for example, 0.2).

The degree of electrochemical action is considered to be related to, for example, the characteristics of the electrode (for example, work function). For example, the first voltage V1 and the second voltage V2 may be changed depending on the materials of the first electrode 11 and the second electrode 12.

In the embodiment, the electrochemical element 10 includes a cathode and an anode. The cathode is one of the first electrode 11 and the second electrode 12. The anode is the other of the first electrode 11 and the second electrode 12.

For example, the cathode may include a cathode base and a cathode-side catalyst member provided on the surface of the cathode base. The anode may include an anode base and an anode-side catalyst member provided on the surface of the anode base. At least a part of the solid polymer electrolyte film is provided between the cathode side catalyst member and the anode side catalyst member. The solid polyelectrolyte film corresponds to the first member 15.

For example, the cathode base includes a carbon film (for example, carbon paper). The cathode side catalyst member includes carbon powder. Platinum is attached to the surface of the carbon powder. The carbon powder holds platinum. For example, the anode base includes a titanium mesh. A platinum film is provided on the surface of the titanium mesh. The platinum film is formed, for example, by a plating process. The anode-side catalyst member includes platinum particles and fluororesin. The solid polyelectrolyte film includes a fluororesin. The fluororesin is, for example, a copolymer of a fluororesin based on sulfonated tetrafluoroethylene.

In such an electrochemical element 10, for example, the first voltage V1 may be not less than 2.5 V and not more than 3.5 V, and the second voltage V2 may be not less than 0.5 V and not more than 1.5 V. High electrochemical action can be obtained. Power consumption can be effectively reduced.

Second Embodiment

Figure 4:
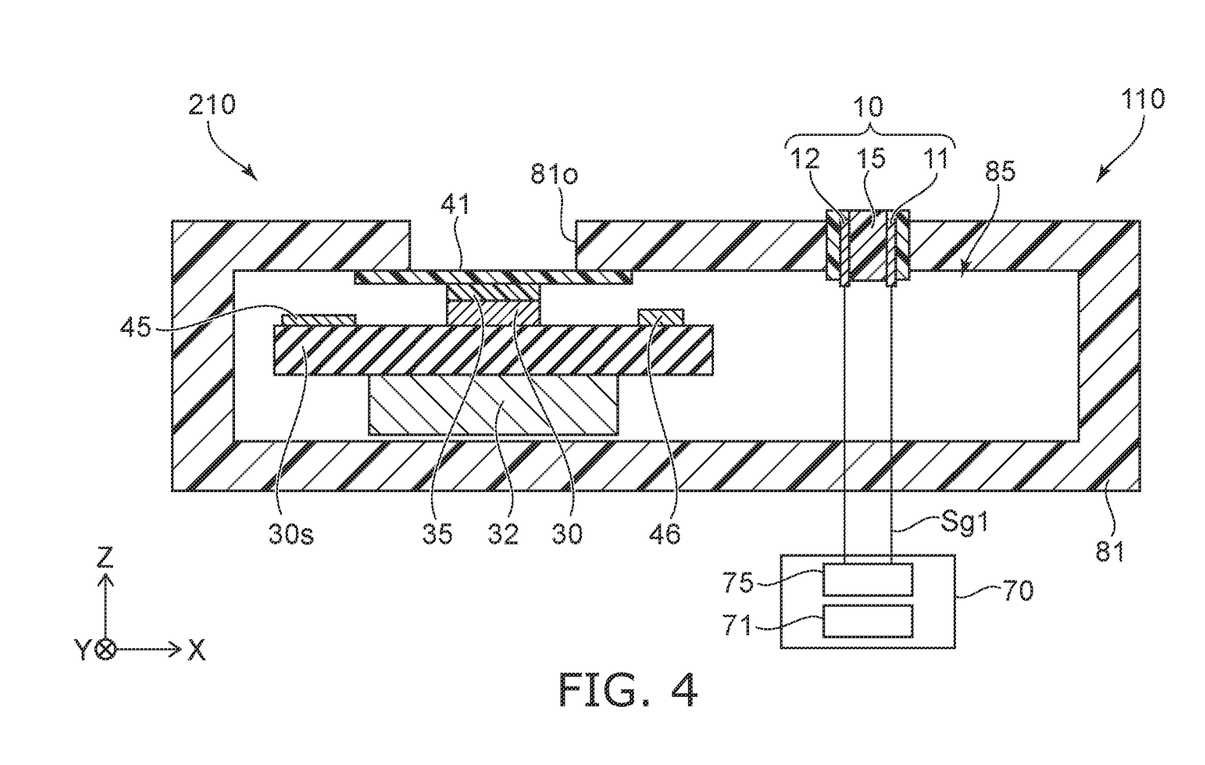
FIG. 4 is a schematic cross-sectional view illustrating a sensor according to a second embodiment.

FIG. 4 is a schematic cross-sectional view illustrating a sensor according to the second embodiment.

As shown in FIG. 4, a sensor 210 according to the embodiment includes the electrochemical device 110 according to the first embodiment and the detector 30. The electrochemical device 110 includes the housing 81. The detector 30 is provided inside the housing 81. The detector 30 is configured to detect at least one selected from the group consisting of hydrogen, oxygen, and VOC (Volatile Organic Compounds).

In this example, the sensor 210 includes the first film 41. The first film 41 may be considered to be included in the electrochemical device 110. The first film 41 is provided between the detector 30 and the opening 810 of the housing 81. At least a part of the first film 41 is porous. The first film 41 includes, for example, a resin including fluorine. The first film 41 includes, for example, PTFE (polytetrafluoroethylene). The first film 41 does not allow a liquid (such as water) to permeate, for example. The first film 41 allows the detection target gas (for example, hydrogen) of the detector 30 to permeate.

In the sensor 210 according to the embodiment, the detector 30 is provided inside the electrochemical device 110 according to the first embodiment. As a result, the environment around the detector 30 can be effectively maintained in the target environment. Higher accuracy detection is possible.

For example, when the humidity in the environment around the detector 30 changes, the detection value of the detection target in the detector 30 is affected. By maintaining the humidity in the environment around the detector 30 within the target range, stable and highly accurate detection becomes possible.

In the embodiment, the first film 41 may be in contact with the detector 30. Alternatively, the distance between the first film 41 and the detector 30 is 1 cm or less. By providing the detector 30 near the first film 41, the gas to be detected that has passed through the first film 41 can be detected with higher accuracy.

In the embodiment, the distance between the electrochemical element 10 and the detector 30 is preferably short. For example, the detector 30 is preferably fixed near the electrochemical element 10. The distance between the electrochemical element 10 and the detector 30 is, for example, not less than 1 mm and not more than 50 mm.

As shown in FIG. 4, the sensor 210 may include a second battery 32. The second battery 32 is configured to supply electric power to the detector 30. By providing the second battery 32, the detection target can be detected even in a place where commercial power is not supplied, for example.

In the sensor 210, the detector 30 is provided on the base body 30s. A lid 35 may be provided between the detector 30 and the first film 41. A humidity sensor 46 may be provided on the base body 30s. The humidity sensor 46 may monitor the humidity in the space 85 inside the housing 81.

The sensor 210 may include a communication portion 45. The communication portion 45 is configured to transmit information about the detection result of the detector 30 to an external device. The detection result includes, for example, information (data) regarding the concentration of the target detection target. Transmission may be, for example, at least either wired or wireless.

Third Embodiment

Figure 5:
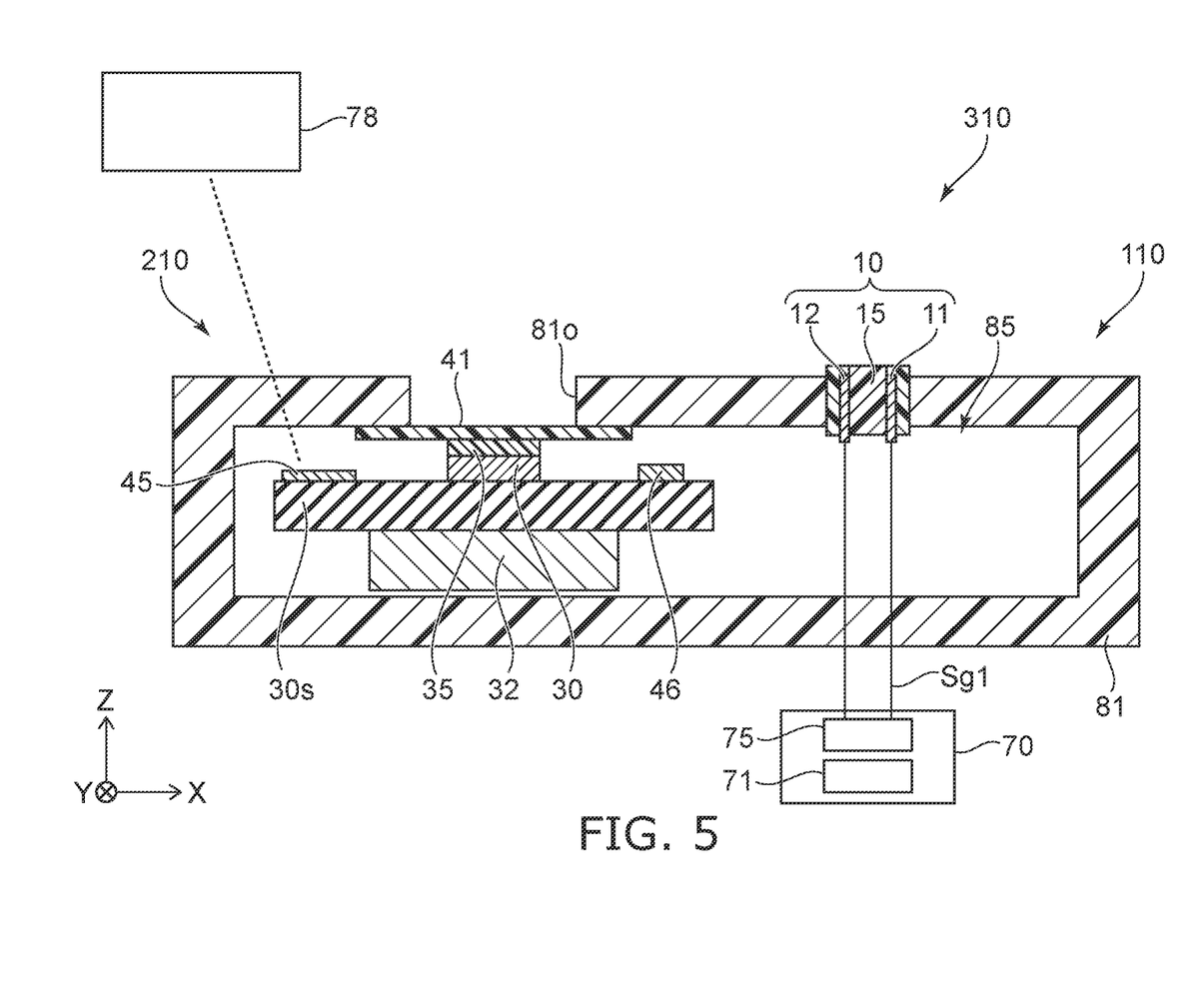
FIG. 5 is a schematic cross-sectional view illustrating the sensor according to a third embodiment.

FIG. 5 is a schematic cross-sectional view illustrating a sensor according to the third embodiment.

As shown in FIG. 5, a sensor system 310 according to the embodiment includes the sensor 210 according to the second embodiment and the processing device 78. The processing device 78 may include, for example, a computer or the like. The sensor 210 includes a communication portion 45. The processing device 78 is configured to process information based on the signal obtained from the communication portion 45. The signal obtained from the communication portion 45 may include, for example, information (data) regarding the detection result in the detector 30.

The processing of information (detection result) in the processing device 78 may include, for example, storage of information (detection result). The processing of the information (detection result) may include, for example, comparison between the information (detection result) and the reference value. The processing device 78 may output an alert or the like according to the result of the comparison. The processing of information (detection result) may include, for example, an arbitrary operation regarding information (detection result). The operation may include, for example, derivation of the maximum value or the like, or derivation of the average value.

The embodiments may include the following configurations (for example, technical proposals).

(Configuration 1)
An electrochemical device, comprising:
an electrochemical element, including a first electrode, a second electrode, and a first member provided between the first electrode and the second electrode; and
a controller electrically connected to the first electrode and the second electrode,
the controller being configured to supply a first signal between the first electrode and the second electrode,
the first signal including a waveform repeating in a first period, the waveform including a first duration of a first voltage of a first polarity, and a second duration of a second voltage of the first polarity, an absolute value of the second voltage being smaller than an absolute value of the first voltage.

(Configuration 2)
The electrochemical device according to Configuration 1, wherein a ratio of the first duration to the first period is 0.5 or less.

(Configuration 3)
The electrochemical device according to Configuration 1, wherein a ratio of the first duration to the first period is 0.1 or less.

(Configuration 4)
The electrochemical device according to any one of Configurations 1-3, wherein the waveform is a square wave.

(Configuration 5)
The electrochemical device according to any one of Configurations 1-4, wherein
The first voltage is not less than 2.5 V and not more than 3.5 V, and
the second voltage is not less than 0.5 V and not more than 1.5 V.

(Configuration 6)
The electrochemical device according to any one of Configurations 1-5, wherein the first member includes a polymer electrolyte.

(Configuration 7)
The electrochemical device according to any one of Configurations 1-6, wherein the electrochemical element is configured to absorb water when a voltage of a first polarity is applied to the first electrode.

(Configuration 8)
The electrochemical device according to Configuration 7, wherein
the electrochemical element is configured to emit water when a voltage of a second polarity is applied to the first electrode, and
the second polarity is opposite to the first polarity.

(Configuration 9)
The electrochemical device according to Configuration 7 or 8, further comprising a housing,
the electrochemical element being configured to absorb water in a space inside the housing.

(Configuration 10)
The electrochemical device according to any one of Configurations 1-6, wherein the electrochemical element is configured to perform at least one of dehumidification, humidification, ozone generation, oxygen generation, oxygen removal, or hydrogen generation.

(Configuration 11)
A sensor, comprising:
the device according to Configuration 9; and
a detector provided inside the housing.

(Configuration 12)
The sensor according to Configuration 11, wherein the detector is configured to detect at least one selected from the group consisting hydrogen, oxygen, and VOCs (Volatile Organic Compounds).

(Configuration 13)
The sensor according to Configuration 11 or 12, further comprising a first film,
the housing including an opening, and
the first film being provided between the detector and the opening.

(Configuration 14)
The sensor according to Configuration 13, wherein at least a part of the first film is porous.

(Configuration 15)

The sensor according to Configuration 13 or 14, wherein the first film includes a resin including fluorine.

(Configuration 16)

The sensor according to any one of Configuration 13-15, wherein
the first film is in contact with the detector, or
a distance between the first film and the detector is 1 cm or less.

(Configuration 17)

The sensor according to any one of Configuration 11-16, wherein a distance between the electrochemical element and the detector is not less than 1 mm and not more than 50 mm.

(Configuration 18)

The sensor according to any one of Configuration 11-17, further comprising a second battery configured to supply power to the detector.

(Configuration 19)

The sensor according to any one of Configuration 11-17, wherein
the controller includes a circuit portion and a first battery,
the first battery is configured to supply electric power to the circuit portion, and
the circuit portion is configured to supply the first signal between the first electrode and the second electrode.

(Configuration 20)

A sensor system, comprising:
the sensor according to any one of Configurations 11-19; and
a processing device,
the sensor including a communication portion, and
the processing device being configured to process information based on a signal obtained from the communication portion.

According to the embodiment, an electrochemical device, a sensor and a sensor system capable of reducing power consumption can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensor systems such as electrochemical elements, electrodes, first members, controllers, housings, detectors, first films, substrates, semiconductor layers, electrodes, insulating films, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all semiconductor devices, and methods for manufacturing semiconductor devices practicable by an appropriate design modification by one skilled in the art based on the semiconductor devices, and the methods for manufacturing semiconductor devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An electrochemical device, comprising:
an electrochemical element, including a first electrode, a second electrode, and a first member provided between the first electrode and the second electrode; and
a controller electrically connected to the first electrode and the second electrode,
the controller being configured to supply a first signal between the first electrode and the second electrode,
the first signal including a waveform repeating in a first period, the waveform including a first duration of a first voltage of a first polarity, and a second duration of a second voltage of the first polarity, an absolute value of the second voltage being smaller than an absolute value of the first voltage,
wherein
the electrochemical element is configured to absorb a substance in the first duration and in the second duration.

2. The device according to claim 1, wherein a ratio of the first duration to the first period is 0.5 or less.

3. The device according to claim 1, wherein a ratio of the first duration to the first period is 0.1 or less.

4. The device according to claim 1, wherein the waveform is a square wave.

5. The device according to claim 1, wherein
the first voltage is not less than 2.5 V and not more than 3.5 V, and
the second voltage is not less than 0.5 V and not more than 1.5 V.

6. The device according to claim 1, wherein the first member includes a polymer electrolyte.

7. The device according to claim 1, wherein the substance is water.

8. The device according to claim 7, wherein
the electrochemical element is configured to emit water when a voltage of a second polarity is applied to the first electrode, and
the second polarity is opposite to the first polarity.

9. The device according to claim 7, further comprising a housing,
the electrochemical element being configured to absorb water in a space inside the housing.

10. The device according to claim 1, wherein the electrochemical element is configured to perform at least one of dehumidification, humidification, ozone generation, oxygen generation, oxygen removal, or hydrogen generation.

11. A sensor, comprising:
the device according to claim 9; and
a detector provided inside the housing.

12. The sensor according to claim 11, wherein the detector is configured to detect at least one selected from the group consisting hydrogen, oxygen, and VOCs (Volatile Organic Compounds).

13. The sensor according to claim 11, further comprising a first film,
the housing including an opening, and
the first film being provided between the detector and the opening.

14. The sensor according to claim 13, wherein at least a part of the first film is porous.

15. The sensor according to claim 13, wherein the first film includes a resin including fluorine.

16. The sensor according to claim 13, wherein
the first film is in contact with the detector, or
a distance between the first film and the detector is 1 cm or less.

17. The sensor according to claim 11, wherein a distance between the electrochemical element and the detector is not less than 1 mm and not more than 50 mm.

18. The sensor according to claim 11, further comprising a second battery configured to supply power to the detector.

19. The sensor according to claim 11, wherein
the controller includes a circuit portion and a first battery,
the first battery is configured to supply electric power to the circuit portion, and
the circuit portion is configured to supply the first signal between the first electrode and the second electrode.

20. A sensor system, comprising:
the sensor according to claim 11; and
a processing device,
the sensor including a communication portion, and
the processing device being configured to process information based on a signal obtained from the communication portion.

21. The device according to claim 1, wherein
the electrochemical element is configured to emit the substance when a voltage of a second polarity is applied to the first electrode, and
the second polarity is opposite to the first polarity.

* * * * *